United States Patent [19]

Sueda et al.

[11] Patent Number: 4,641,962
[45] Date of Patent: Feb. 10, 1987

[54] ABERRATION MEASURING METHOD

[75] Inventors: Tetsuo Sueda, Chofu; Minoru Yoshii, Tokyo, both of Japan

[73] Assignee: Canon Kabushiki Kaisha, Tokyo, Japan

[21] Appl. No.: 496,208

[22] Filed: May 19, 1983

[30] Foreign Application Priority Data

May 25, 1982 [JP] Japan .................................. 57-88429

[51] Int. Cl.$^4$ .............................................. G01B 9/00
[52] U.S. Cl. ...................................... 356/124; 356/127
[58] Field of Search ................................ 356/124–127

[56] References Cited

U.S. PATENT DOCUMENTS

3,891,322  6/1975  Hock ..................................... 356/124
4,139,305  2/1979  Lapornik ............................. 356/125
4,275,964  6/1981  Vassiliadis .......................... 356/125
4,281,926  8/1981  Cornsweet ......................... 356/124

Primary Examiner—R. A. Rosenberger
Assistant Examiner—Crystal D. Cooper
Attorney, Agent, or Firm—Fitzpatrick, Cella, Harper & Scinto

[57] ABSTRACT

In aberration measurement, a light beam from a light source provided at the image plane position of a lens to be examined is caused to enter the lens to be examined, the light beam passed through the lens to be examined, is separated into a plurality of light rays in a plane perpendicular to a principal ray or in a plane perpendicular to the optical axis of the lens to be examined, and the position of each light beam is detected at a position which is spaced apart from a position optically conjugate with said image plane position with respect to the lens to be examined and at which the plurality of light rays can be separated from one another.

11 Claims, 15 Drawing Figures

ABERRATION MEASURING METHOD

BACKGROUND OF THE INVENTION

1. Field of the Invention

This invention relates to a method of measuring the aberrations in a lens system.

2. Description of the Prior Art

Figure 1:
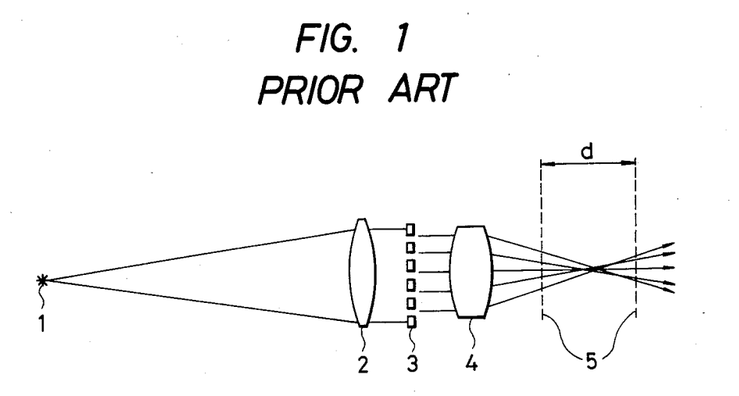
FIGS. 1 and 2 show an apparatus using the aberration measuring method according to the prior art.
Figure 2:
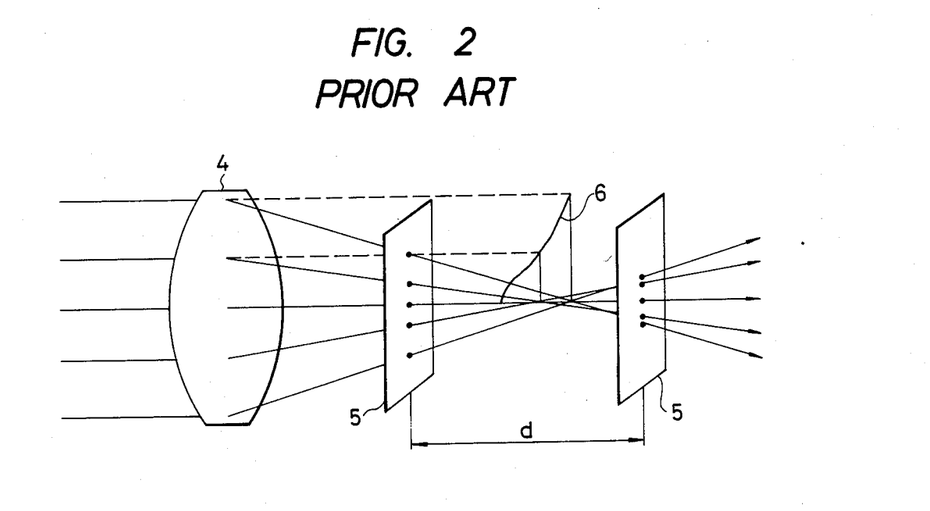

The method as shown in FIG. 1 of the accompanying drawings is known as a method of measuring the aberrations in a lens system, namely, spherical aberration, coma, astigmatism and curvature of image field. In FIG. 1, which shows a prior art example for measuring spherical aberration, reference numeral 1 designates a point light source and reference numeral 2 denotes a collimater lens system for collimating the light from the light source 1. Designated by 3 is a so-called Hartmann's plate which serves to set the height of the light entering the entrance pupil of a lens 4 to be examined. Denoted by 5 are photosensitive surfaces which serve to record the light emergent from the lens. Spherical aberration is measured by the use of the light recorded with the photosensitive surface 5 placed forwardly of the imaging point of the lens and the light recorded with the photosensitive surface 5 placed rearwardly of that position by a finite distance d. That is, the conjugate exposure points on the two photosensitive surfaces have been linked together as shown in FIG. 2 of the accompanying drawings and light ray pursuit has been effected from a position at which the light rays cross the optical axis or the image plane, and the resultant data has been interpolated to thereby calculate a spherical aberration curve 6. This method, however, has required the two photosensitive surfaces provided at two locations to be accurately positioned and also has involved the necessity of highly accurately reading the position of each light ray and determining the light ray position. Moreover, two light ray positions must be read to determine a single light ray, and this has led to the disadvantage that much time is required for measurement and the result of the measurement becomes unstable.

SUMMARY OF THE INVENTION

It is an object of the present invention to provide an aberration measuring method which overcomes the above-noted disadvantage peculiar to the aberration measuring method according to the prior art.

It is a further object of the present invention to provide an aberration measuring method suitable for processing the result of the measurement by a computer.

In the aberration measuring method according to the present invention, a point light source is formed at the position of the image plane in the case of the regular projection method in which a lens to be examined is actually used (the image plane being hereinafter simply referred to as the image plane of the lens to be examined), namely, the position whereat the image of an object reduced more than the actual size of the object is formed, and the light beam passed through the lens to be examined is separated into a plurality of predetermined light rays and such light rays are detected at a position which is spaced apart from a position optically conjugate with the position of said image plane and at which said plurality of light rays can be separated and identified from one another, whereby aberrations are measured. When the aberrations in the finite imaging of the lens to be examined are to be measured, an enlarged image of the point light source may be obtained by the lens to be examined, but when the aberrations in the infinite imaging of the lens to be examined are to be measured, the light beam passing through the lens to be examined becomes a parallel light beam and therefore, a collimater lens for converging such parallel light beam is required. In such case, an enlarged image of the point light source can be obtained by making the focal length of the collimater lens longer than the focal length of the lens to be examined.

When the light beam passed through the lens to be examined is to be separated into a plurality of light rays, it is separated into a plurality of light rays spaced apart from a principal ray by a predetermined distance in a plane perpendicular to the principal ray or separated into a plurality of light rays spaced apart from the optical axis of the lens to be examined by a predetermined distance in a plane perpendicular to said optical axis.

The fact that the aforementioned light rays can be separated and identified from one another means that the light rays are separated so that their positions can be ascertained and to which of the separated light rays each of those light rays corresponds can be identified.

The invention will become more fully apparent from the following detailed description thereof taken in conjunction with the accompanying drawings.

DESCRIPTION OF THE PREFERRED EMBODIMENT

Figure 3:
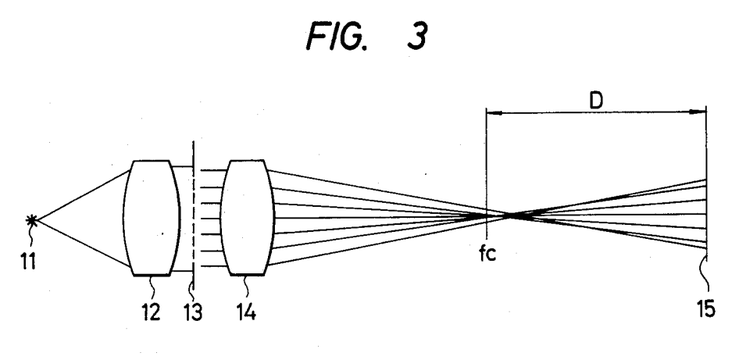
FIG. 3 shows an embodiment using the method according to the present invention to measure the case of infinite imaging.
Figure 4:
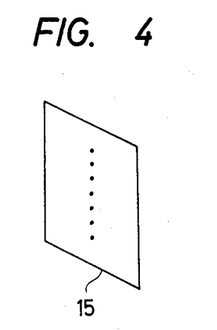
FIGS. 4, 5, 6 and 7 are views for illustrating the method of the present invention by the use of the apparatus shown in FIG. 3.
Figure 5:
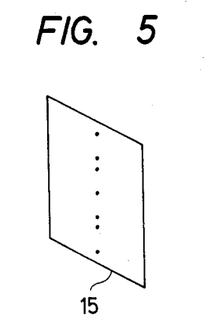

FIG. 3 shows an embodiment of the aberration measuring method of the present invention and illustrates a case where the aberrations when a lens to be examined is at infinity imaging, that is, when the object during regular projection is at an infinite distance, are measured. Designated by 11 is the light source unit of this apparatus which is a monochromatic point light source or line light source constituted by an incandescent lamp or a low pressure discharge tube, a filter for monochromatizing the same, and a pin-hole or a slit. Of course, the monochromatic point light source or line light source may be formed by a laser and a short focal distance lens system. In the case of a line light source, it has its lengthwise direction oriented in a direction orthogonal to the plane of the drawing sheet. Denoted by 12 is a lens to be examined. It is placed with its imaging position, i.e., its image plane position, being coincident with the light source 11. Reference numeral 13 designates a Hartmann's plate for separating, in a plane perpendicular to the optical axis of the lens 12 to be examined, the light beam from the lens 12 into a plurality of light rays spaced apart from the optical axis by a predetermined distance. The Hartmann's plate comprises a pin-hole array arranged in the vicinity of the pupil of the lens 12 which includes the optical axis. Accordingly, it separates the light beam emergent from the lens 12 into a plurality of light rays to be examined which are limited to predetermined heights from the optical axis. Reference numeral 14 designates a lens whose aberrations are well corrected (herein referred to as the collimater lens). The focal length $f_C$ of the collimater lens 14 is sufficiently longer than the focal length $f_T$ of the lens 12 to be examined. Designated by 15 is a photosensitive surface provided at a position spaced apart from the condensing position of the collimater lens 14, namely, such a position forward or rearward of the condensing position that the light rays can be sufficiently separated and identified (distinguished from one another). The light beam emitted from the light source 11 is converted by the lens 12 to be examined into a parallel light beam. This parallel light beam forms light rays corresponding to the height of the entrance pupil of the lens 12 by the Hartmann's plate 13. The entrance pupil of the lens 12 means the entrance pupil when the lens 12 is used in the actually used regular projection, that is, such that the image of the object is reduced in size from the actual size of the object. The thus made light rays are condensed by the collimater lens 14 placed rearwardly of the Hartmann's plate and impinge on the photosensitive surface placed forwardly or rearwardly of the image plane of the collimater lens 14. If it is assumed that the collimater lens 14 has sufficiently good aberrations as compared with the lens 12 to be examined and the lens 12 has no aberration and the Hartmann's plate 13 comprises openings arranged at equal intervals, the patterns of the light rays recorded on the photosensitive surface 15 will be at equal intervals as shown in FIG. 4. However, if aberration (spherical aberration) exists in the lens 12 to be examined, the patterns of the light rays will be at unequal intervals as shown in FIG. 5 as is the case with the aforedescribed prior art. The amount of shift of these unequal intervals from the equal intervals corresponds to the lateral aberration of the lens 12 to be examined. The aforedescribed prior art example is of the regular projection type and the sensitivity which determines the positions of the light rays must correspond to the required measurement accuracy of lateral aberration. The present invention is of the reverse projection type in which a point light source is provided at the image plane position of the lens to be examined and therefore, the determination of the positions of the light rays is multiplied by the projection magnification and thus, the image of the point light source is generally enlarged. In a system using a collimater lens as in the present embodiment, if the focal length of the collimater lens is $f_C$ and the focal length of the lens to be examined is $f_T$, the amount of shift from the equal intervals of the light rays will be $f_C/f_T$ times that in a case where the aberration of the lens to be examined is detected by regular projection method like that shown in FIG. 1. That is, if the detection sensitivities of the positions of the light rays are the same, the present invention will be higher in lateral aberration detecting ability. Thus, if the detection accuracy of spherical aberration is the same as that in the aforedescribed prior art example, the coordinate detection accuracy of light on the photosensitive surface 15 may safely be low. Also, as a method of detecting spherical aberration, there is a method comprising disposing the photosensitive surface at a predetermined distance D from the focal point of the collimater lens 14, and geometrically calculating the spherical aberration of the lens to be examined. The tolerance within which this photosensitive surface must be disposed, as compared with that with which the photosensitive surface of the aforedescribed prior art example is installed, is enlarged by an amount corresponding to longitudinal magnification because enlarged projection is effected. That is, the former accuracy may safely be lower than the latter accuracy.

Figure 6:
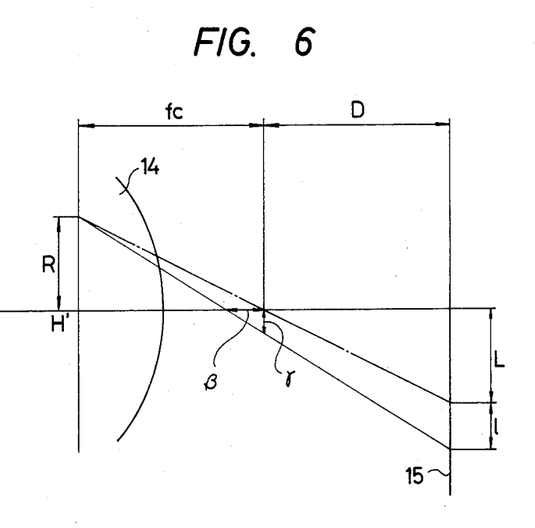

In the present invention, the light beam is detected by the reverse projection method and moreover at a defocused position, and therefore, the position of the light beam in the case of the regular projection must be calculated on the basis of the detected value. As an example of such a method of detecting spherical aberration, a method for geometrically detecting spherical aberration with the photosensitive surface installed at a predetermined position will now be described by reference to FIG. 6. In FIG. 6, $f_C$ is the focal length of the collimater lens, R is the height of the hole of the Hartmann's plate from the optical axis, D is the length from the focus position of the collimater lens 14 to the photosensitive surface 15, and L indicates the position of the light ray (dot-and-dash line) on the photosensitive surface 15 when there is no aberration in the lens to be examined. When there is spherical aberration in the lens to be examined, the light ray enters a place spaced apart from the ideal light ray by l. The spherical aberration of the lens to be examined during the reverse projection which corresponds to this light ray is in a condition multiplied by the magnification, and the amount of longitudinal aberration thereof is defined as $\beta$ and the amount of lateral aberration thereof is defined as $\gamma$. This amount of lateral aberration $\gamma$ can be expressed as $$\gamma = \frac{f_C \times (L + l + R)}{f_C + D} - R$$

by the use of said $f_C$, D, R and the height L+l of the light ray measured. From this amount of lateral aberration $\gamma$, the amount of lateral aberration $\gamma'$ during the regular projection can be calculated as $$\gamma' = -\frac{f_T}{f_C}\gamma$$

with the sign thereof taken into account. Here, $f_T$ is the focal length of the lens to be examined. Also, the amount of longitudinal aberration $\beta$ during the reverse projection can be expressed as $$\beta = \frac{\gamma \times (f_C + D)}{R + L + l}.$$

From the value of this amount of longitudinal aberration $\beta$, the amount of longitudinal aberration $\beta'$ during the regular projection can be calculated as $$\beta' = -\left(\frac{f_T}{f_C}\right)^2 \times \beta$$

with the sign thereof taken into account.

The foregoing is the description for a single light ray, but the same thing can be said about all light rays that have passed through the Hartmann's plate and therefore, by connecting various aberration points by gentle curves, it is possible to find the spherical aberration curve during the regular projection.

In FIG. 6, description has been made with spherical aberration taken as an example, but of cource, measurement of coma for the off-axis parallel light beam can be carried out by a similar technique.

Figure 7:
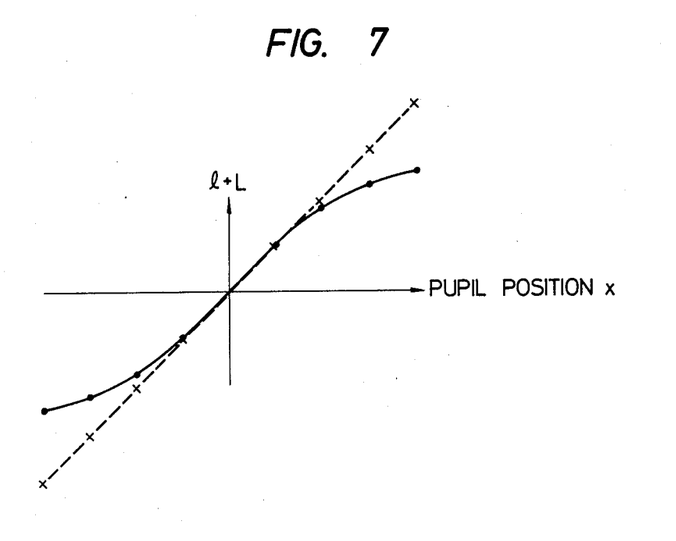

The method of measuring the amount of aberration shown in FIG. 6 is a geometrical method, but the amount of aberration during the regular projection can be found also by a method using a calculation formula and an example thereof will hereinafter be described by reference to FIG. 7. In FIG. 7, the ordinate represents the value of L+l which is the measured value of each light ray, and the abscissa represents the height X of the pupil by the Hartmann's plate from the optical axis, and the solid line indicates a lateral aberration in a condition in which the amount of lateral aberration of the lens to be examined during the regular projection is multiplied by the magnification and which includes a defocus error by D. The broken line indicates the position of the light ray on the defocus plane when there is no aberration in the lens to be examined. If the value of L+l is $\gamma(X)$ and the pupil height is X, the position of each light ray can be expressed as $$\gamma(X) = a_1 X + a_2 X^2 + a_3 X^3 + a_4 X^4 + \ldots + a_n X^n$$

by the use of the polynomial approximation method. Here, the first order term represents the defocus and therefore is zero at the paraxial image point, and further, spherical aberration is in contact with the X axis at the paraxial image point and therefore, the second order term also is zero. Accordingly, the lateral aberration on the focal plane of the collimater lens $f_C$ during the reverse projection is $$\gamma(X) = a_3 X^3 + a_4 X^4 + \ldots + a_n X^n.$$

From this lateral aberration $\gamma(X)$, the lateral aberration $\gamma'(X)$ during the regular projection can be expressed as $$\gamma'(X) = -\frac{f_T}{f_C} \cdot \gamma(X).$$

Also, the longitudinal aberration $\beta'(X)$ during the regular projection can be expressed as $$\beta'(X) = \frac{f_T}{f_C} \gamma'(X).$$

In this manner, the lateral and longitudinal aberrations during the regular projection can be found also from calculations by the polynomial approximation.

Figure 8:
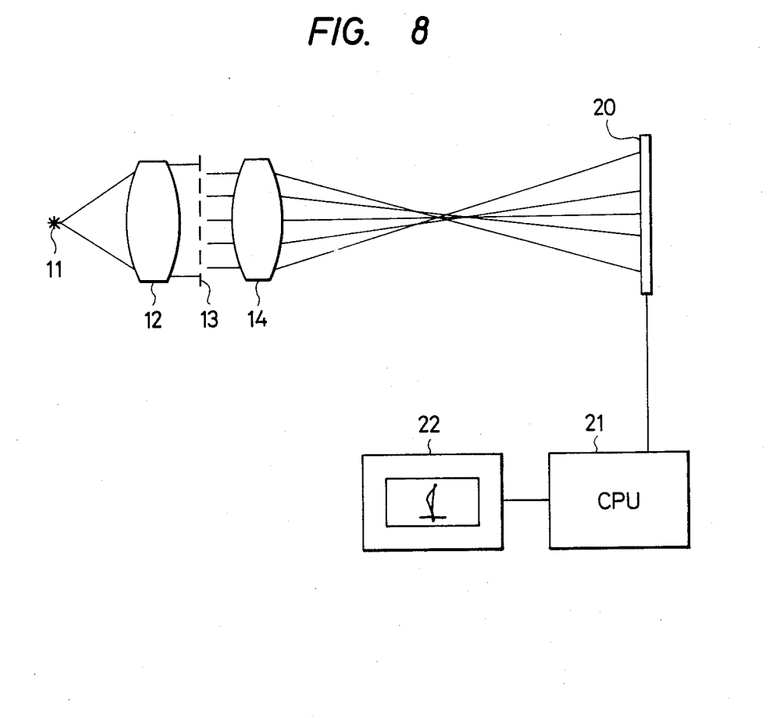
FIG. 8 schematically shows an embodiment of the automatic measuring apparatus using the measuring method according to the present invention.

In the present invention, use is made of the reverse projection method, i.e., the enlargement projection method and therefore, the reading accuracy and the installation accuracy of the photosensitive surface 15 can be made low as previously described. Accordingly, the photosensitive surface 15 can be constituted by a photodiode array or the like consisting of a rougher pitch than the imaging characteristic of the lens to be examined, since the latter characteristic represents the measure of an expanding width of an intensity distribution of a point image formed on the photosensitive surface 15 by the lens to be examined, and this makes it possible to introduce the output data into a microcomputer or the like and effect automatic measurement in which the aforementioned operation is carried out. FIG. 8 schematically shows such an automatic measuring apparatus. In FIG. 8, reference numeral 20 designates a photodetector such as a photodiode array, reference numeral 21 denotes an operational circuit such as a microcomputer, and reference numeral 22 designates an external output instrument such as a CRT or a printer which indicates the result of the operation. In the case of such automatic measurement, wave front aberration can be simply found particularly from geometro-optical aberration and therefore, measurement and evaluation of the lens system can be effected with respect to various parameters. Where wave front aberration W(X) is to be determined, the following equation may be used:

$$W(X) = \frac{1}{f_T} \int_0^X \gamma'(X) dX.$$

That is, the aforementioned polynomial equation can be integrated in the direction of height of the pupil.

Figure 9:
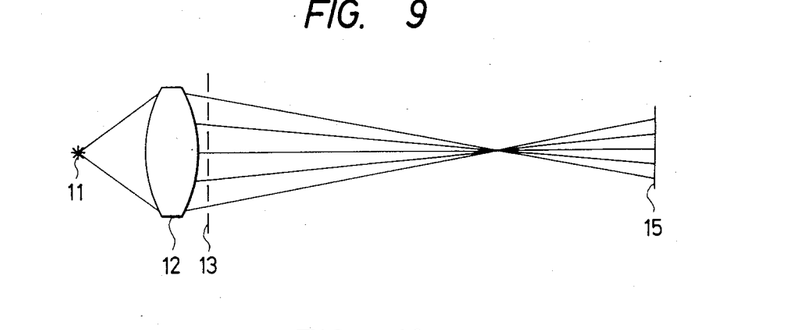
FIGS. 9 and 10 show a method of measuring the aberrations in the case of finite imaging in accordance with the present invention.
Figure 10:
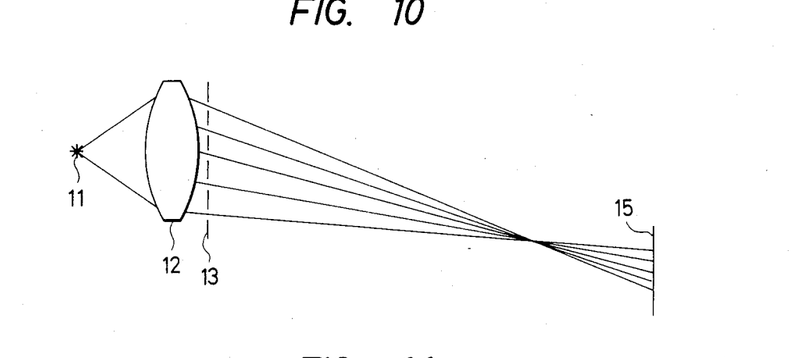

While the measuring method of the present invention has been described by taking as an example the measurement of infinity on-axis aberration using a collimater lens, the collimater lens is not required when measurement is effected at a finite magnification. FIG. 9 shows the measurement of the on-axis aberration in the imaging at a finite magnification, and FIG. 10 shows the measurement of the aberration of the off-axis light beam at the finite magnification. The Hartmann's plate 13 is provided at a position between the lens 12 to be examined and the image of the point light source 11 by the lens 12 and sufficiently near the lens 12 to be examined, and the image of the point light source 11 by the lens 12 to be examined 13 an enlarged image of the point light source 11. A light ray detecting surface 15 is provided at such a position spaced apart from the image of the point light source that the light rays separated by the Hartmann's plate can be sufficiently separated and identified from one another.

Figure 11:
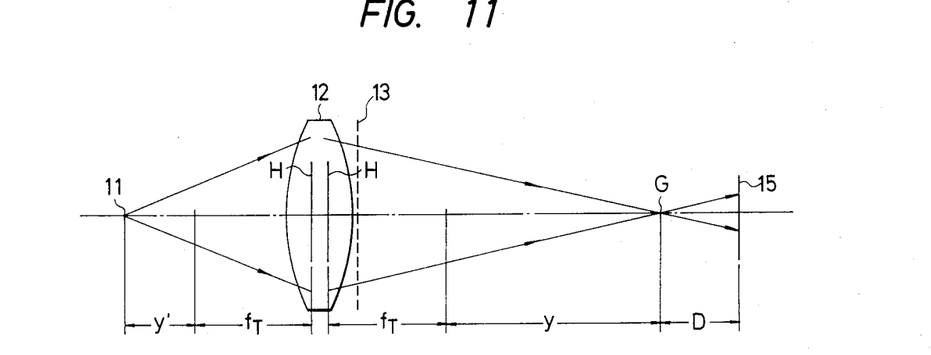
FIG. 11 shows a method of finding the aberrations in a lens to be examined in the case of finite distance imaging in accordance with the present invention.

Description will now be made of how to find the value in the case of the regular projection from the measured value in the reverse projection of the lens to be examined when the object lies at said finite distance. FIG. 11 shows an arrangement for measuring the aberrations in the lens 12 to be examined when the object distance is finite. In FIG. 11, H represents the principal plane of the lens to be examined, $f_T$ the focal length of the lens to be examined, y' the distance from one focus position of the lens 12 to be examined to the point light source 11, and y the distance from the other focus position of the lens to be examined to the condensing position G. The position information of each light ray measured by the photosensitive surface 15 can be converted into the information of the converged position of the light ray at the condensing position G by the use of the distance between the Hartmann's plate 13 and the condensing position G and the distance D between the condensing position G and the photosensitive surface, as in the case of the infinity imaging. If the amount of lateral aberration and the amount of longitudinal aberration at the condensing position G are $\gamma$ and $\beta$, respectively, the amount of lateral aberration $\gamma'$ during the regular projection can be calculated as $$\gamma' = -\frac{y'}{y}\gamma$$

and the amount of longitudinal aberration $\beta'$ during the regular projection can be calculated as $$\beta' = -(y'/y)^2\beta.$$

Also, the calculation by the polynomial approximation can be carried out likewise as described above.

In the above-described embodiment, the case as shown in FIGS. 3 and 8 wherein the object distance is infinite and the case as shown in FIGS. 9 and 10 wherein the object distance is finite have been shown discretely, but actually, the aberrations for various object distances must be measured by a single apparatus. Accordingly, the collimater lens 14 is retractably provided in the optical path and is inserted in the optical path only in the case of the measurement of the aberrations in the lens to be examined in the infinity imaging. Also, the light source 11 provided at the image plane position of the lens 12 to be examined has the image plane position thereof varied as the object distance of the lens 12 to be examined varies, and therefore, it is necessary to provide means for varying the spacing between the light source 11 and the lens 12 to be examined in the direction of the optical axis with the variation in the image plane position. It is also necessary to measure both the on-axis and off-axis aberrations of the lens to be examined, and this also leads to the necessity of providing means for varying the relative positional relation between the light source 11 and the lens 12 to be examined in the direction orthogonal to the optical axis. The converged position of the measuring light rays also is varied by the type of the lens to be examined and the variation in object distance and therefore, it is desirable that the position of the photosensitive surface 15 be set so as to be movable along the optical path.

Figure 12A:
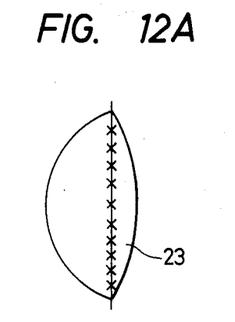
FIGS. 12A and 12B show how a Hartmann's plate is provided relative to the pupil where off-axis aberrations are to be measured.
Figure 12B:
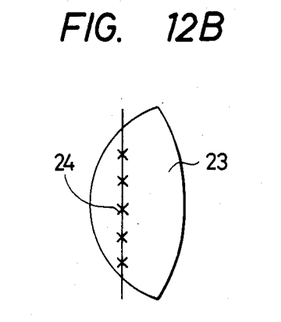

When the off-axis light beam is to be measured, as the place which determines the sagittal light ray limited by the Hartmann's plate, there are two cases: (i) where the maximum value of the diameter of the pupil 23 is selected as shown in FIG. 12A, and (2) where the principal ray 24 is included as shown in FIG. 12B, and such selection must be made in accordance with the applicable measuring conditions.

Figure 13A:
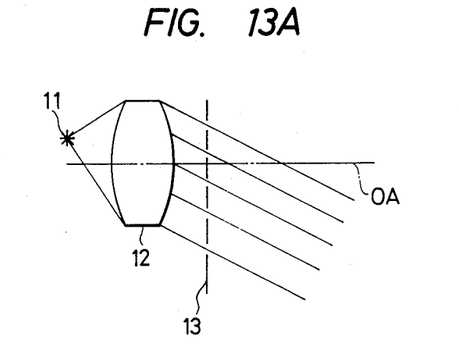
FIGS. 13A and 13B show how a Hartmann's plate is provided when off-axis aberrations are to be measured.
Figure 13B:
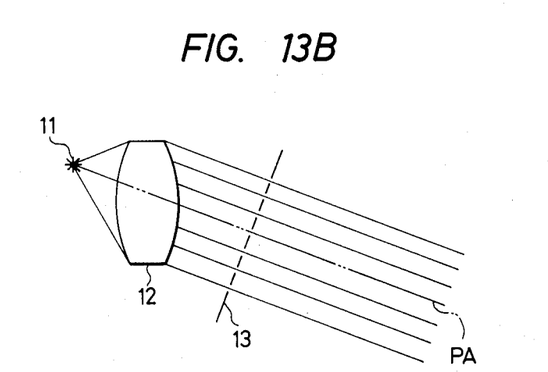

FIGS. 13A and 13B show the positions where the Hartmann's plate is provided when the off-axis light beam is measured. FIG. 13A refers to a case where the Hartmann's plate 13 is disposed perpendicularly to the optical axis OA of the lens 12 to be examined, and FIG. 13B refers to a case where the Hartmann's plate 13 is disposed perpendicularly to the principal ray PA. In both of these cases, the opening portions of the plate are provided so as to pass therethrough light rays of predetermined heights. Of course, any device having the function of selectively taking out a plurality of light rays of predetermined heights from a light beam in this manner may be used instead of the Hartmann's plate.

Also, as described above, it is usually practiced that the detection position of light rays where the light rays can be sufficiently separated and identified from one another is selected such that the mutual relations between the light rays can be detected in the same condition as when the light beam is separated into a plurality of light rays by the Hartmann's plate, but if the correspondence relation between each light ray when the light beam is separated and each light ray at its detected position can be identified, the light rays may be detected at any position where the light rays can be separated.

As described above, the aberration measurement at infinity above, the aberration measurement at infinity imaging and the aberration measurement at finite imaging may either require or not require a collimater lens, and therefore, in the measuring apparatus using the present invention, it is preferable that the collimater lens be provided so as to be retractably insertable in the measuring optical path.

Thus, in the aberration measuring method according to the present invention, the optical system is a reverse projection system and a light source is provided on the image plane of the lens to be examined and the converged or diverged condition of each light ray forming the image of the light source enlarged and projected by the aforementioned optical system is observed at a position sufficiently distant from the image of the light source, whereby the aberrations of the lens to be examined are measured. This method can maintain the measurement accuracy high and is an excellent method suitable for automatic measurement.

What we claim is:

1. An aberration measuring method comprising the steps of:
   providing a light source at a regular projection image plane position of a lens to be examined and causing a light beam from the light source to enter the lens to be examined;
   separating the light beam passed through the lens to be examined into a plurality of light rays which lie in at least one plane parallel to a principal ray or parallel to the optical axis of the lens to be examined, said separating step being performed at a position in the vicinity of the lens to be examined so as to pass the light rays at predetermined heights from the optical axis;
   detecting the position of each light ray at a position which is spaced apart from a position optically conjugate with the image plane position with respect to the lens to be examined and at which the plurality of light rays can be separated from one another; and
   measuring the aberration of the lens to be examined on the basis of the detected positions of the plurality of light rays.

2. An aberration measuring method comprising the steps of:
   providing a light source at a regular projection image plane position of a lens to be examined and making the light beam from the light source into a parallel light beam by means of said lens to be examined;
   separating the light beam passed through the lens to be examined into a plurality of light rays which lie in at least one plane parallel to a principal ray or parallel to the optical axis of the lens to be examined;
   converging said plurality of parallel light rays by means of a collimater lens having a focal length longer than the focal length of the lens to be examined and having the aberrations therein well corrected; and
   detecting the position of each light ray at a position which is spaced apart from a position optically conjugate with the image plane position with respect to an optical system comprising the lens to be examined and the collimater lens and at which the plurality of light rays can be separated from one another.

3. An aberration measuring apparatus comprising:

light source means provided at a regular projection image plane position of a lens to be examined to apply a light beam to the lens to be examined;

means for separating the light beam passed through the lens to be examined into a plurality of light rays which lie in at least one plane parallel to a principal ray or parallel to the optical axis of the lens to be examined at a position in the vicinity of the lens to be examined so as to pass the light rays at predetermined heights from the optical axis;

light ray position detecting means, for detecting the position of each of the plurality of light rays, provided at a position which is spaced apart from a position optically conjugate with the image plane position with respect to the lens to be examined and at which the plurality of light rays can be separated from one another; and means for measuring the aberration of the lens to be examined on the basis of the positions of the plurality of light rays detected by the light ray position detecting means.

4. An aberration measuring apparatus comprising:

light source means provided at a focal plane position of a lens to be examined to apply a light beam to the lens to be examined;

means for separating the light beam from said light source made into a parallel light beam by means of the lens to be examined into a plurality of light rays which lie in at least one plane parallel to a principal ray or parallel to the optical axis of the lens to be examined;

light ray condensing means for condensing the light rays from said separating means, said light ray condensing means having a focal length longer than the focal length of the lens to be examined and having the aberrations therein well corrected; and light ray position detecting means provided at a position which is spaced apart from the focal plane of said light ray condensing means and at which the light rays can be separated from one another.

5. An aberration measuring apparatus comprising:

light source means for causing a measuring light beam to enter a lens to be examined, said light source means being provided at a regular projection image plane position of the lens to be examined;

means for setting the spacing between the lens to be examined and said light source means correspondingly to said image plane position of an object positioned at any finite distance selected on the basis of the lens to be examined;

means for separating the light beam passed through the lens to be examined into a plurality of light rays which lie at least one plane parallel to a principal ray or parallel to the optical axis of the lens to be examined;

light beam converging means retractably disposed on an optical path opposite to the lens to be examined with respect to said light beam separating means and disposed on said optical path when the infinity imaging characteristic of the lens to be examined regarding an object positioned at an infinite distance is examined, the aberrations in said light beam converging means being well corrected, the focal length of said light beam converging means being long as compared with the focal length of the lens to be examined; and light ray position detecting means provided at a position which is spaced apart from the condensed position of the light rays by the lens to be examined, or by the lens to be examined and said light beam converging means, and at which the plurality of light rays can be separated from one another and can be detected respectively.

6. An aberration measuring apparatus according to claim 5, further comprising means for calculating the aberrations for the case of regular projection on the basis of the information from said light ray position detecting means.

7. The method of claim 1, wherein said separating step is performed so that the light rays lie in one plane.

8. The method of claim 2, wherein said separating step is performed so that the light rays lie in one plane.

9. The apparatus of claim 3, wherein said separating means causes the light rays to lie in a single plane.

10. The apparatus of claim 4, wherein said separating means causes the light rays to lie in a single plane.

11. The apparatus of claim 5, wherein said separating means causes the light rays to lie in a single plane.

* * * * *